United States Patent
Lortz et al.

(10) Patent No.: US 9,419,802 B2
(45) Date of Patent: Aug. 16, 2016

(54) SECURE MESSAGE FILTERING TO VEHICLE ELECTRONIC CONTROL UNITS WITH SECURE PROVISIONING OF MESSAGE FILTERING RULES

(75) Inventors: Victor B. Lortz, Beaverton, OR (US); Somya Rathi, Sunnyvale, CA (US); Anand P. Rangarajan, Hillsboro, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 13/992,304

(22) PCT Filed: Dec. 1, 2011

(86) PCT No.: PCT/US2011/062929
§ 371 (c)(1),
(2), (4) Date: Mar. 18, 2014

(87) PCT Pub. No.: WO2013/105916
PCT Pub. Date: Jul. 18, 2013

(65) Prior Publication Data
US 2014/0195808 A1 Jul. 10, 2014

(51) Int. Cl.
*H04L 29/06* (2006.01)
*H04L 9/32* (2006.01)
(Continued)

(52) U.S. Cl.
CPC ............ *H04L 9/3247* (2013.01); *G06F 15/177* (2013.01); *H04L 9/3244* (2013.01); *H04L 63/0263* (2013.01); *H04L 63/123* (2013.01);
(Continued)

(58) Field of Classification Search
CPC ...... H04L 67/12; H04L 2209/84; H04L 63/08
USPC .......................................................... 713/170
See application file for complete search history.

(56) References Cited

U.S. PATENT DOCUMENTS

| 6,816,971 B2 | 11/2004 | Schmidt et al. |
| 8,989,954 B1 * | 3/2015 | Addepalli ............. H04W 4/046 370/328 |
| 2002/0110146 A1 | 8/2002 | Thayer et al. |

(Continued)

FOREIGN PATENT DOCUMENTS

EP      2178257      4/2010

OTHER PUBLICATIONS

McAfee Host Intrusion Prevention 7.0.3 Extension Release Notes, Aug. 13, 2013.

(Continued)

*Primary Examiner* — Jason K Gee
(74) *Attorney, Agent, or Firm* — Grossman, Tucker, Perreault & Pfleger PLLC

(57) ABSTRACT

A method according to one embodiment includes the operations of configuring a host processor to receive a message filtering rule, the host processor associated with a vehicle; configuring a bus controller to verify authenticity of the message filtering rule, wherein the bus controller is programmed through an interface, the interface inaccessible from the host processor; filtering messages from the host processor using the verified message filtering rule, wherein the filtering is performed by the bus controller; and transmitting the filtered messages from the bus controller over a bus to one or more electronic control units (ECUs), the ECUs communicatively coupled to the bus.

17 Claims, 3 Drawing Sheets

(51) Int. Cl.
*G06F 15/177* (2006.01)
*H04L 29/08* (2006.01)
(52) U.S. Cl.
CPC .............. *H04L 67/34* (2013.01); *H04L 63/126* (2013.01); *H04L 63/1466* (2013.01); *H04L 67/12* (2013.01)

(56) References Cited

U.S. PATENT DOCUMENTS

| | | | |
|---|---|---|---|
| 2004/0003252 A1* | 1/2004 | Dabbish et al. ............... | 713/175 |
| 2006/0036356 A1* | 2/2006 | Rasin .................. | H04M 1/6091 |
| | | | 701/1 |
| 2010/0205429 A1 | 8/2010 | Alrabady et al. | |
| 2010/0332715 A1 | 12/2010 | Hadden et al. | |
| 2011/0083011 A1 | 4/2011 | Dicrescenzo | |
| 2012/0155645 A1* | 6/2012 | Prochaska ................. | H04L 9/12 |
| | | | 380/278 |

OTHER PUBLICATIONS

Koscher et al., "Experimental Security Analysis of a Modern Automobile", 2010 IEEE Symposium on Security and Privacy.
International Search Report and Written Opinion received for PCT application No. PCT/US2011/062929, mailed on Apr. 4, 2012, 12 Pages.
Extended European Search Report from European application 11879164.9 mailed Aug. 7, 2015, 7 pages.
Cheswick et al., "Firewalls and Internet Security", 2003, Addison-Wesley, USA, XP002741880, 13 pages.
Menezes, et al., "Handbook of Applied Dypotography", 1997, CRC Press LLC, USA, XP001525011, 65 pages.

* cited by examiner

SECURE MESSAGE FILTERING TO VEHICLE ELECTRONIC CONTROL UNITS WITH SECURE PROVISIONING OF MESSAGE FILTERING RULES

FIELD

The present disclosure relates to secure message filtering to vehicle electronic control units, and more particularly, to secure message filtering to vehicle electronic control units with secure provisioning of message filtering rules.

BACKGROUND

As vehicle control systems become increasingly complex, interconnected and accessible through wireless communication, these systems also become increasingly vulnerable to security attacks. Embedded controllers (for engines, brakes, etc.) are typically designed to withstand hostile physical environments, but often little attention is paid to the security environment. It has generally been assumed that software running on each controller, connected to a common bus, can be trusted (i.e., not infected with malware), although that philosophy is beginning to change.

The presumption of security safety is no longer justified as recent studies have shown that vehicles with internet connectivity and/or wireless interfaces such as Bluetooth and WiFi may permit a platform in the vehicle to become infected. Such a malicious platform can then reprogram other controllers on the bus and/or send messages to these controllers which are capable of causing catastrophic harm to the vehicle and its occupants. One approach to this problem is to implement specific and unique security enhancements to each individual embedded controller, but this may require significant involvement on the part of all Original Equipment Manufacturers (OEMs) and may result in duplication of efforts or adoption of incompatible approaches.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for implementing a rule-based message filter in the firmware of a bus controller for a bus, to which a vehicle's electronic control units are connected. The firmware may be protected from unauthorized manipulation and the message filter rules may be verified for authenticity and security. Additionally, methods are provided for generating secure message filter rules that may be authenticated prior to implementation.

Figure 1:
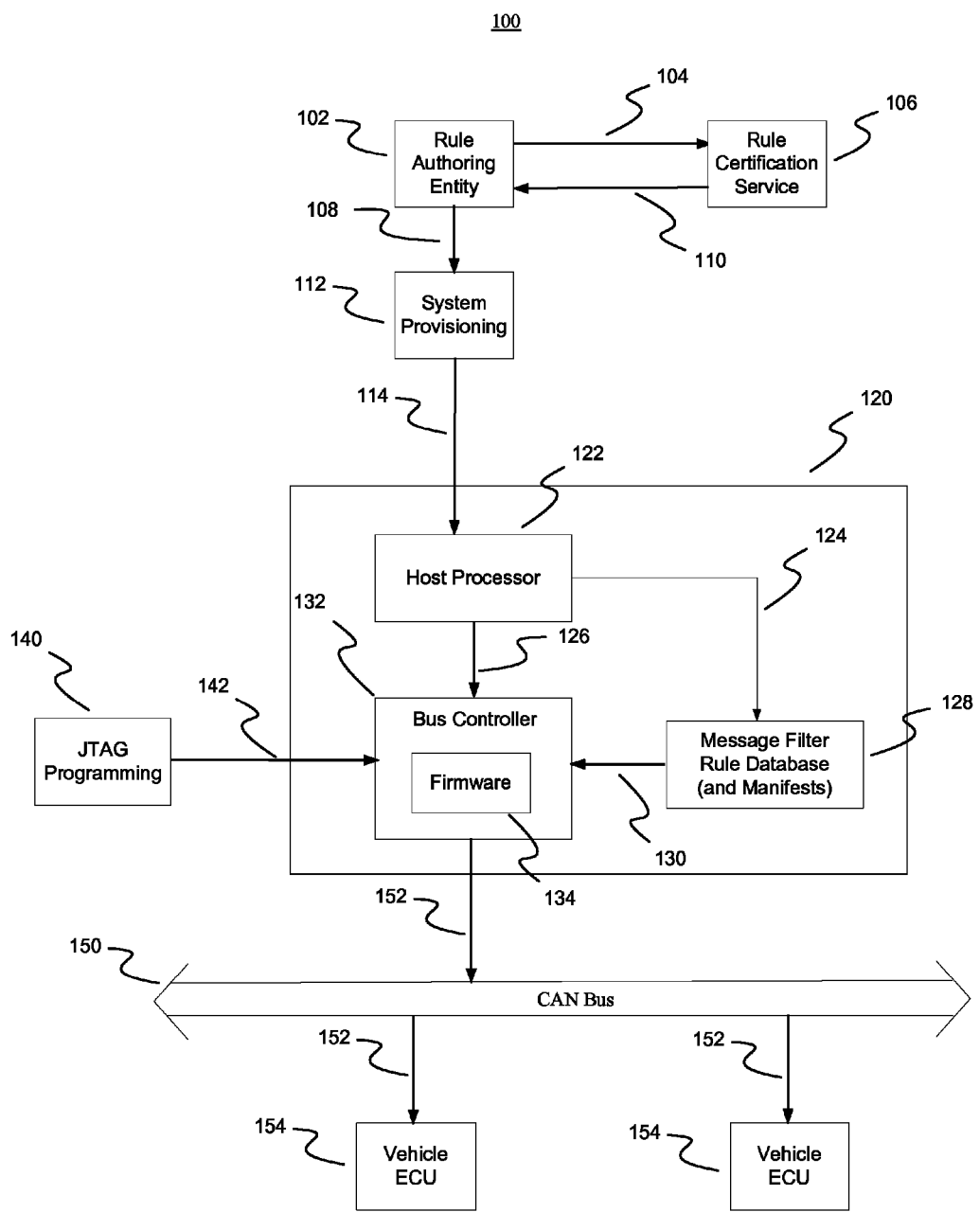
FIG. 1 illustrates a system block diagram of one exemplary embodiment.

FIG. 1 illustrates a system block diagram 100 of one exemplary embodiment. System 100 of this embodiment generally includes a vehicle based host platform 120. Host platform 120 may be an in-vehicle information and/or entertainment (IVI) system. Host platform 120 may include wireless connectivity to the internet, Bluetooth devices, WiFi networks, and/or any other communication networks. Host platform 120 may comprise host processor 122, bus controller 132, and message filter rule database 128. Host processor 122 may receive message filtering rules 114 from a rule provisioning system 112 through a wireless interface and store those rules 124 in the message filter rule database 128. Host processor 122 also generates unfiltered messages 126 to be sent to the bus controller 132. Host processor 122 may communicate with bus controller 132 through a Peripheral Component Interconnect (PCI) bus, a Universal Serial Bus (USB) or other suitable interface.

Bus controller 132 may comprise firmware 134 implemented in a field programmable gate array (FPGA) or other suitable programmable logic circuitry. Bus controller firmware 134 may be programmed by a Joint Test Action Group (JTAG) programming unit 140 through a JTAG interface 142 or other suitable programming methods that are similarly inaccessible to the host processor 122 and any other processors or controllers associated with the vehicle. Limiting programmability access to the bus controller firmware 134 increases the security of that firmware 134. Programming of the bus controller firmware 134 includes message filter logic and message filter rule verification logic. The message filter rule verification logic may include a trusted rule-signing key as will be explained in greater detail below.

Bus controller firmware 134 is responsible for receiving unfiltered messages 126 from the host processor 122, filtering those messages and sending the filtered messages 152 to the bus 150. Bus controller firmware 134 performs this filtering based on rules 130 obtained from the message filter rule database 128. The filtering rules may be used to prevent unauthorized and/or potentially malicious messages from being sent over the bus 150 to various vehicle electronic control units (ECUs) 154. The bus 150 may be a Controller Area Network (CAN) bus or other suitable bus. The vehicle ECUs (154) may be embedded controllers for the engine, brakes, transmission or other vehicle systems or sensors.

Most ECU messages are original equipment manufacturer (OEM) specific and proprietary, and therefore the OEM generally determines how message filter rules are constructed so that messages sent to the ECUs 154 will be safe and appropriate. An initial set of rules may be pre-loaded or provisioned in the message filter rule database 128 by the OEM, but it is useful for the rules to be updatable through the wireless connectivity of the host platform 120, so that the OEM can evolve the rules over time to enable new features or close newly-discovered security vulnerabilities. New or updated message filter rules 114 obtained in this manner, however, generally cannot be trusted due to security vulnerabilities inherent in the internet and wireless networks as well as the fact that software running in the host processor 122, which has full access to these message filter rules 114, may be compromised.

In order to verify the authenticity and security of new message filtering rules 114 provided to the host platform 120, a secure rule provisioning system is employed. A trusted rule authoring entity 102, such as the OEM, is provided with rule authoring tools that enable the entity 102 to generate a digital signature to be associated with a newly authored set of rules. The rule authoring entity 102 sends the new set of rules and the digital signature 104 to a rule certification service 106 which can verify the identity of the rule authoring entity 102 based on the digital signature. The rule certification service 106 then generates a digital manifest to be associated with the new rule set to indicate that the rule set is trusted and sends this manifest 110 back to the rule authoring entity 102. The rule authoring entity 102 sends this rule set and manifest 108 to a provisioning system 112 where it can be made available to host platform 120 by any suitable method of transmission. Host platform 120 stores the rule set and associated manifest 124 in the message filter rule database 128.

Bus controller firmware 134 can verify the authenticity and security of message filter rules 130 obtained from the database 128, based on the manifest associated with the rule set, in combination with a trusted rule-signing key that is provided to the firmware 134 as part of the firmware 134 secure programming 142. The key may be an asymmetric key used in combination with the manifest to decrypt the rule set. If the bus controller firmware 134 cannot verify the authenticity of the message filter rules 130, it may ignore the new rules and continue to use an existing rule or it may cease to transmit messages to the vehicle ECUs 154 and signal an error condition.

By providing message filtering capability, executed on secure firmware using trusted message filtering rules, any compromise in the integrity of the host processor or the IVI system will not lead to a compromise in the security of the rest of the vehicle including safety critical ECU functions.

Figure 2:
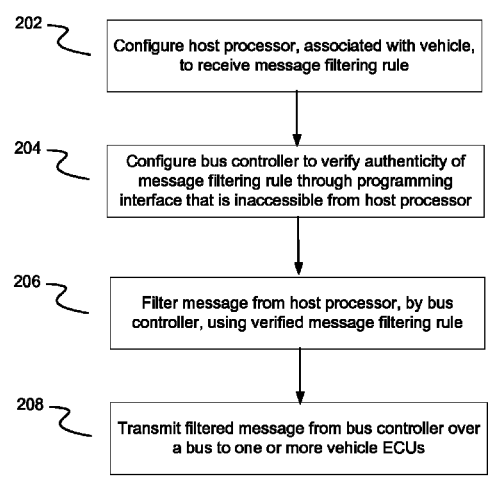
FIG. 2 illustrates a flowchart of operations of one exemplary embodiment.

FIG. 2 illustrates a flowchart of operations 200 of one exemplary embodiment. At operation 202, a host processor associated with a vehicle is configured to receive message filtering rules. The rules may be received through a wireless interface from a rule provisioning system external to the vehicle. At operation 204, a bus controller is configured to verify the authenticity of the message filtering rules. At operation 206, the bus controller filters messages from the host processor using the verified message filtering rules. The bus controller is configured to verify rules and perform filtering through a programming interface that is inaccessible to the host processor. The programming interface may be a JTAG interface and the bus controller may be implemented as an FPGA. At operation 208, the bus controller transmits the filtered message over a bus to one or more vehicle ECUs. If the bus controller cannot verify the authenticity of the message filtering rules, it may ignore the new rules and continue to use existing rules or it may cease to transmit messages and signal an error condition.

Figure 3:
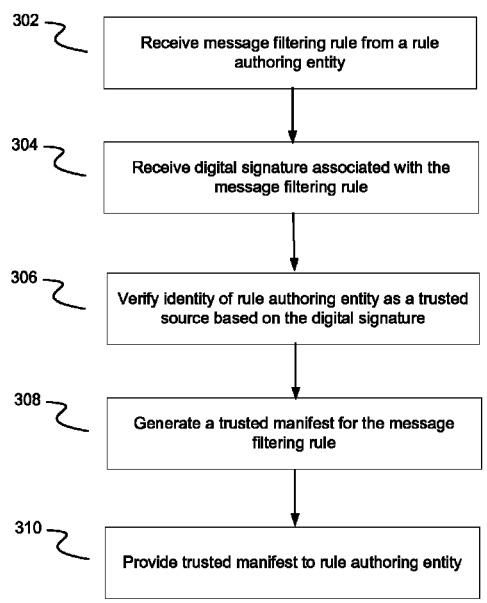
FIG. 3 illustrates a flowchart of operations of another exemplary embodiment.

FIG. 3 illustrates a flowchart of operations 300 of another exemplary embodiment. At operation 302, a rule certification service receives message filtering rules from a rule authoring entity. At operation 304, the rule certification service receives a digital signature associated with the message filtering rules from the rule authoring entity. The rule authoring entity may generate the digital signature using rule authoring tools provided by the rule certification service. At operation 306, the rule certification service verifies the identity of the rule authoring entity as a trusted source based on the digital signature. At operation 308, the rule certification service generates a trusted manifest to be associated with the message filtering rules. At operation 310, the rule certification service provides the trusted manifest to the rule authoring entity. The rule authoring entity may then transmit the message filtering rules and the associated trusted manifest to a vehicle based host platform.

Although the automobile industry and OEMs may, over time, take steps to develop more secure ECUs, the rule based message filtering system described herein may be cooperatively employed with and take advantage of any additional platform security measures that are implemented in the future. In the meantime, the rule based message filtering system described herein may be employed to mitigate the risks posed by IVI platforms which have the greatest exposure to malware infection.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system, comprising:
  a host processor associated with a vehicle, said host processor configured to receive an encrypted new or updated message filtering rule produced by a rule authenticating entity and a trusted manifest associated with said encrypted new or updated message filtering rule;
  a bus configured to convey messages between said host processor and one or more electronic control units (ECUs) communicatively coupled to said bus;
  a bus controller configured to:
    filter messages from said host processor using one or more message filtering rules in a message filtering rule data repository, wherein filtering said messages includes receiving unfiltered messages from said host processor for transmission on said bus, generating filtered messages by removing unfiltered messages that potentially include malicious code for altering operation of said vehicle using said one or more message filtering rules, and sending said filtered messages to said bus;
perform authentication operations to verify the authenticity of said encrypted new or updated message filtering rule with said trusted manifest and a trusted rule-signing key; and
when the encrypted new or updated message filtering rule is determined to be authentic, decrypt the encrypted new or updated message filtering rule using a combination of the trusted manifest and the trusted rule-signing key to produce a decrypted new or updated message filtering rule, and updating the message filtering rule data repository with said decrypted new or updated message filtering rule; and
wherein said bus controller is programmable through an interface that is inaccessible to said host processor.

2. The system of claim 1, wherein when said encrypted new or updated message filtering rule is determined to not be authentic, said bus controller ignores said encrypted new or updated message filtering rule.

3. The system of claim 1, wherein when said encrypted new or updated message filtering rule is determined to not be authentic, said bus controller is configured to block messages from said host processor and signal an error.

4. The system of claim 1, wherein said bus controller comprises a Field Programmable Gate Array (FPGA) and said programming interface comprises a Joint Test Action Group (JTAG) interface.

5. The system of claim 1, wherein said bus comprises a Controller Area Network (CAN) bus.

6. The system of claim 1, wherein said host processor comprises an In-Vehicle Infotainment (IVI) platform.

7. The system of claim 1, wherein host processor is configured to receive said encrypted new or updated message filtering rule via a wireless connection from a source external to said vehicle.

8. A method, comprising:
receiving, with a host processor associated with a vehicle, an encrypted new or updated message filtering rule produced by a rule authoring entity and a trusted manifest associated with the encrypted new or updated message filtering rule;
filtering, with a bus controller of said vehicle, messages from said host processor based on message filtering rules in a message filtering data repository, wherein filtering said messages includes receiving unfiltered messages from said host processor for transmission on a bus, generating filtered messages by removing unfiltered messages that potentially include malicious code for altering operation of said vehicle using said one or more message filtering rules, and sending said filtered messages to said bus;
transmitting said filtered messages from said bus controller over said bus to one or more ECUs, said ECUs communicatively coupled to said bus;
performing, with said bus controller, authentication operations to verify the authenticity of said encrypted new or updated message filtering rule at least in part with said trusted manifest and a trusted rule-signing key;
when said authentication operations determine that the encrypted new or updated message filtering rule is authentic:
decrypting said encrypted new or updated message filtering rule with said bus controller and using a combination of said trusted manifest and said trusted rule-signing key, thereby producing a decrypted new or updated message filtering rule; and
updating said message filtering data repository with said decrypted new or updated message filtering rule;
wherein said bus controller is programmable through an interface that is inaccessible by said host processor.

9. The method of claim 8, wherein the method further comprises:
ignoring, with said bus controller, said encrypted new or updated message filtering rule when it is determined that the encrypted new or updated message filtering rule is not authentic.

10. The method of claim 8, further comprising: when said encrypted new or updated message filtering rule is determined to not be authentic, blocking messages from said host processor with said bus controller and signaling an error.

11. The method of claim 8, wherein said bus controller comprises a Field Programmable Gate Array (FPGA) and said programming interface comprises a Joint Test Action Group (JTAG) interface.

12. The method of claim 8, wherein said bus comprises a Controller Area Network (CAN) bus.

13. The method of claim 8, wherein said host processor comprises an In-Vehicle Infotainment (IVI) platform.

14. The method of claim 8, wherein said receiving is accomplished at least in part via a wireless connection between said host processor and a source external to said vehicle.

15. A non-transitory computer-readable storage medium having instructions stored thereon which when executed by a processor result in the following operations comprising:
receiving, with a host processor associated with a vehicle, an encrypted new or updated message filtering rule produced by a rule authoring entity and a trusted manifest associated with the encrypted new or updated message filtering rule, wherein filtering said messages includes receiving unfiltered messages from said host processor for transmission on a bus, generating filtered messages by removing unfiltered messages that potentially include malicious code for altering operation of said vehicle using said one or more message filtering rules, and sending said filtered messages to said bus;
filtering, with a bus controller of said vehicle, messages from said host processor based on message filtering rules in a message filtering data repository;
transmitting said filtered messages from said bus controller over said bus to one or more ECUs, said ECUs communicatively coupled to said bus;
performing, with said bus controller, authentication operations to verify the authenticity of said encrypted new or updated message filtering rule at least in part with said trusted manifest and a trusted rule-signing key;
when said authentication operations determine that the encrypted new or updated message filtering rule is authentic:
decrypting said encrypted new or updated message filtering rule with said bus controller and using a combination of said trusted manifest and said trusted rule-signing key, thereby producing a decrypted new or updated message filtering rule; and
updating said message filtering data repository with said decrypted new or updated message filtering rule;
wherein said bus controller is programmable through an interface that is inaccessible by said host processor.

16. The non-transitory computer-readable storage medium of claim 15, wherein said operations further comprise:

ignoring, with said bus controller, said encrypted new or updated message filtering rule when it is determined that the encrypted new or updated message filtering rule is not authentic.

17. The non-transitory computer-readable storage medium of claim 15, wherein said operations further comprise:
when said encrypted new or updated message filtering rule is determined to not be authentic, blocking messages from said host processor with said bus controller and signaling an error.

\* \* \* \* \*